United States Patent
Zhang et al.

(10) Patent No.: US 12,548,535 B2
(45) Date of Patent: Feb. 10, 2026

(54) DISPLAY MASK LAYER GENERATION AND RUNTIME ADJUSTMENT

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 18/719,100

(22) PCT Filed: Feb. 14, 2022

(86) PCT No.: PCT/CN2022/076134
§ 371 (c)(1),
(2) Date: Jun. 12, 2024

(87) PCT Pub. No.: WO2023/151067
PCT Pub. Date: Aug. 17, 2023

(65) Prior Publication Data
US 2024/0412711 A1    Dec. 12, 2024

(51) Int. Cl.
*G09G 5/36* (2006.01)

(52) U.S. Cl.
CPC ..... *G09G 5/363* (2013.01); *G09G 2300/0452* (2013.01); *G09G 2340/0457* (2013.01)

(58) Field of Classification Search
CPC .......... G09G 5/363; G09G 2300/0452; G09G 2340/0457
See application file for complete search history.

(56) References Cited

U.S. PATENT DOCUMENTS 6,593,904 B1 * 7/2003 Marz ............... G09G 3/3648
345/3.1
7,215,347 B2 * 5/2007 Phan ................. H04N 9/30
345/694

(Continued)

FOREIGN PATENT DOCUMENTS

CN    112384843 A    2/2021
FR    3093886 A1    9/2020

(Continued)

OTHER PUBLICATIONS

Supplementary European Search Report—EP229254297—Search Authority—MUNICH—Jun. 24, 2025.

(Continued)

*Primary Examiner* — Cheng Yuan Tseng
(74) *Attorney, Agent, or Firm* — Procopio, Cory, Hargreaves & Savitch LLP

(57) ABSTRACT

Aspects presented herein relate to methods and devices for display processing including an apparatus, e.g., a DPU. The apparatus may configure at least one mask layer including a set of mask units associated with a set of physical sub-pixel values, the at least one mask layer being configured based on a target display configuration. The apparatus may also store the at least one mask layer to a device storage of a device. Further, the apparatus may retrieve the at least one mask layer from the device storage during a run-time period. The apparatus may also compare the target display configuration to a current display configuration of a display panel. The apparatus may also apply or refrain from applying the at least one mask layer to the display panel during the run-time period based on the comparison of the target display configuration to the current display configuration.

30 Claims, 11 Drawing Sheets

(56) References Cited

U.S. PATENT DOCUMENTS

| | | | | |
|---|---|---|---|---|
| 7,880,842 B2* | 2/2011 | Saitoh | ........... | G02F 1/13363 |
| | | | | 349/119 |
| 8,334,545 B2* | 12/2012 | Levermore | ........... | H10K 59/351 |
| | | | | 257/E33.013 |
| 9,274,345 B2* | 3/2016 | Mather | ........... | G02B 30/32 |
| 9,648,310 B2* | 5/2017 | King | ........... | H04N 13/31 |
| 10,733,783 B2* | 8/2020 | Vlachos | ........... | G06T 19/006 |
| 11,145,233 B1* | 10/2021 | Dao | ........... | H04N 23/57 |
| 11,582,497 B2* | 2/2023 | Streater | ........... | H04N 21/8173 |
| 11,709,424 B2* | 7/2023 | Tang | ........... | G02F 1/133514 |
| | | | | 345/55 |
| 12,108,625 B2* | 10/2024 | Ichikawa | ........... | H10K 50/16 |
| 12,284,902 B2* | 4/2025 | Sun | ........... | H10K 77/111 |
| 12,289,976 B2* | 4/2025 | Qi | ........... | H10K 59/35 |
| 12,482,193 B2* | 11/2025 | Chenna Madhavuni | ........... | |
| | | | | G06T 19/006 |
| 2007/0126611 A1* | 6/2007 | Streater | ........... | H04N 19/13 |
| | | | | 375/E7.258 |
| 2008/0089608 A1 | 4/2008 | Phillips | | |
| 2009/0109127 A1* | 4/2009 | Chang | ........... | G09G 3/003 |
| | | | | 345/6 |
| 2013/0100012 A1* | 4/2013 | Todorovich | ........... | G09G 3/3466 |
| | | | | 345/156 |
| 2018/0217450 A1* | 8/2018 | Ma | ........... | G02F 1/133514 |
| 2019/0081113 A1* | 3/2019 | Gu | ........... | H10K 59/131 |
| 2021/0181827 A1 | 6/2021 | Zou et al. | | |
| 2021/0319563 A1* | 10/2021 | Zhang | ........... | G06T 1/20 |
| 2024/0412711 A1* | 12/2024 | Zhang | ........... | G09G 3/20 |

FOREIGN PATENT DOCUMENTS

| | | |
|---|---|---|
| GB | 2597583 A | 2/2022 |
| JP | 2011082798 A | 4/2011 |

OTHER PUBLICATIONS

International Search Report and Written Opinion—PCT/CN2022/076134—ISA/CN—Oct. 21, 2022.

* cited by examiner

FIG. 5

DISPLAY MASK LAYER GENERATION AND RUNTIME ADJUSTMENT

CROSS REFERENCE TO RELATED APPLICATION(S)

This application is a National Stage Application filed under 35 U.S.C. § 371 of PCT International Application No. PCT/CN2022/076134, entitled "DISPLAY MASK LAYER GENERATION AND RUNTIME ADJUSTMENT" and filed Feb. 14, 2022, which is expressly incorporated by reference herein in its entirety.

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that may perform display processing. The apparatus may obtain a set of physical sub-pixel values associated with a set of mask units, where the set of physical sub-pixel values is obtained prior to configuring at least one mask layer. The apparatus may also configure at least one mask layer including a set of mask units, the set of mask units being associated with a set of physical sub-pixel values, the at least one mask layer being configured based on a target display configuration. Additionally, the apparatus may store, upon configuring the at least one mask layer, the at least one mask layer to a device storage of a device. The apparatus may also retrieve the at least one mask layer from the device storage during a run-time period after the at least one mask layer is stored. The apparatus may also compare the target display configuration to a current display configuration of a display panel. Moreover, the apparatus may apply or refrain from applying the at least one mask layer to the display panel during the run-time period based on the comparison of the target display configuration to the current display configuration. The apparatus may also adjust, upon applying or refraining from applying the at least one mask layer to the display panel, the at least one mask layer during the run-time period based on the current display configuration. The apparatus may also generate, upon applying or refraining from applying the at least one mask layer to the display panel, the at least one mask layer during the run-time period based on the current display configuration.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is a diagram illustrating an example mask for display processing.

DETAILED DESCRIPTION

Figure 1:
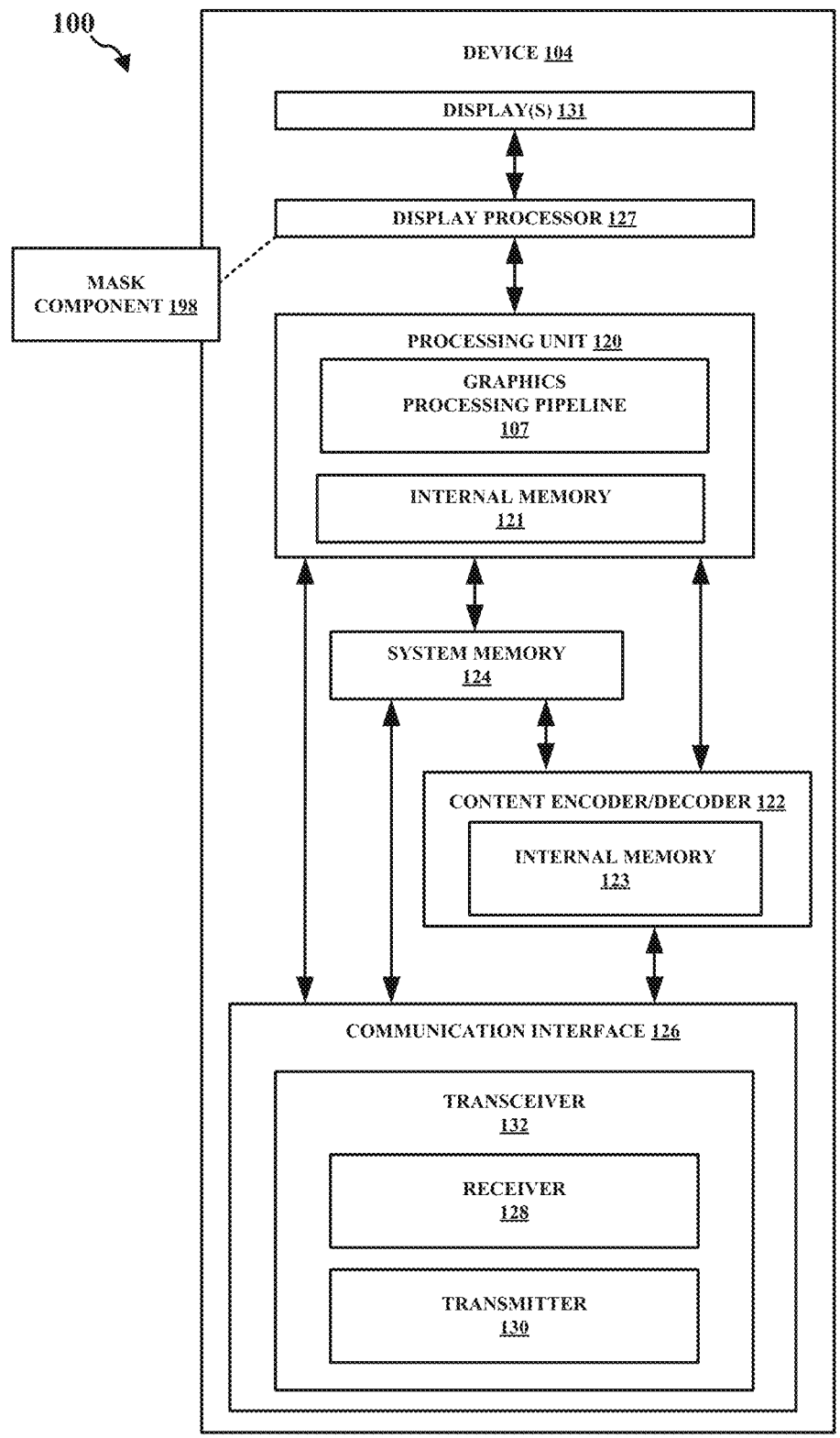
FIG. 1 is a block diagram that illustrates an example content generation system.

Some aspects of display processing may utilize different types of mask layers (e.g., a shape mask layer) to reshape a display frame. For instance, a mask layer may reshape the display frame to provide more optimized visual shapes at the display panel (e.g., improved round corners, improved circular shape, improved rectangular shape, etc.). In some aspects, these types of mask layers (e.g., shape mask layers) may be based on certain unit, such as a pixel. Also, some types of display processing may utilize certain rendering techniques with mask layers, such as sub-pixel rendering (SPR). In some types of display techniques, certain types of conversion filters (e.g., pixel-to-physical sub-pixel conversion filters) may produce blur artifacts and other artifacts to a basis mask (e.g., a logical pixel basis mask). Also, when designing mask layers, an accurate physical shape may be desired. However, in some instances, such as for low dots-per-inch (DPI) or points-per-inch (PPI) display devices, the pixel level mask accuracy may not be enough to produce the desired shape accuracy. Some types of visual effects associated with masks may change along with different filter configurations. These types of SPR filters may help to calculate a physical conversion value of a pixel. Additionally, a physical sub-pixel value may change as the SPR filter configuration changes. That is, an SPR filter may be adjusted in order to adjust a physical sub-pixel value. In some aspects, a DDIC analog configuration may cause an error in a hardware round corner shape mask, as well as other types of shape masks. In some types of pixel conversion, a shape mask may be adjusted along with the adjustment of a filter. For instance, if a logical pixel-to-sub-pixel conversion utilizes complex and flexible filters, the logical pixel basis shape mask may change as the filters are adjusted. As such, adjusting a sub-pixel rendering (SPR) filter may adjust a mask layer shape along with a physical sub-pixel value. This may be a problem as a physical sub-pixel value may be the target of the adjustment, not the mask layer. Also, the presence of the mask may result in an erroneous change to a physical sub-pixel value. Aspects of the present disclosure may prevent an adjustment of a mask layer when adjusting a sub-pixel rendering (SPR) filter. That is, aspects of the present disclosure may adjust an SPR filter without adjusting a mask layer. For instance, aspects of the present disclosure may adjust a physical sub-pixel value when adjusting an SPR filter without adjusting a mask layer. Additionally, in some instances, aspects of the present disclosure may provide a mask layer without erroneously changing a physical sub-pixel value. Moreover, aspects of the present disclosure may utilize physical sub-pixel values as a unit of a mask layer. For example, aspects of the present disclosure may utilize a low-level physical sub-pixel as a basic mask unit for a mask layer.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content. The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a mask component 198 configured to obtain a set of physical sub-pixel values associated with a set of mask units, where the set of physical sub-pixel values is obtained prior to configuring at least one mask layer. The mask component 198 may also be configured to configure at least one mask layer including a set of mask units, the set of mask units being associated with a set of physical sub-pixel values, the at least one mask layer being configured based on a target display configuration. The mask component 198 may also be configured to store, upon configuring the at least one mask layer, the at least one mask layer to a device storage of a device. The mask component 198 may also be configured to retrieve the at least one mask layer from the device storage during a run-time period after the at least one mask layer is stored. The mask component 198 may also be configured to compare the target display configuration to a current display configuration of a display panel. The mask component 198 may also be configured to apply or refrain from applying the at least one mask layer to the display panel during the run-time period based on the comparison of the target display configuration to the current display configuration. The mask component 198 may also be configured to adjust, upon applying or refraining from applying the at least one mask layer to the display panel, the at least one mask layer during the run-time period based on the current display configuration. The mask component 198 may also be configured to generate, upon applying or refraining from applying the at least one mask layer to the display panel, the at least one mask layer during the run-time period based on the current display configuration. Although the following description may be focused on display processing, the concepts described herein may be applicable to other similar processing techniques. As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
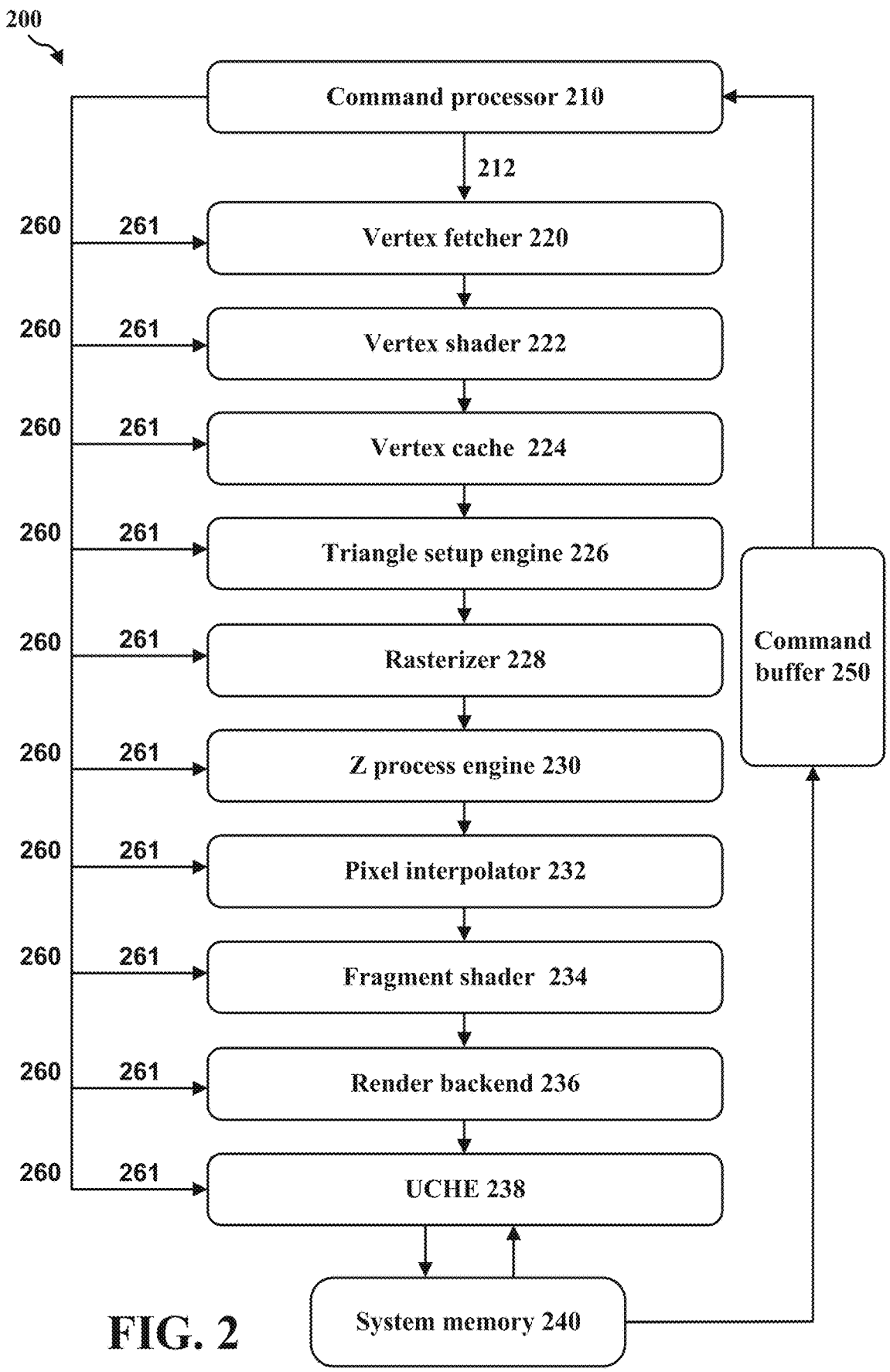
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
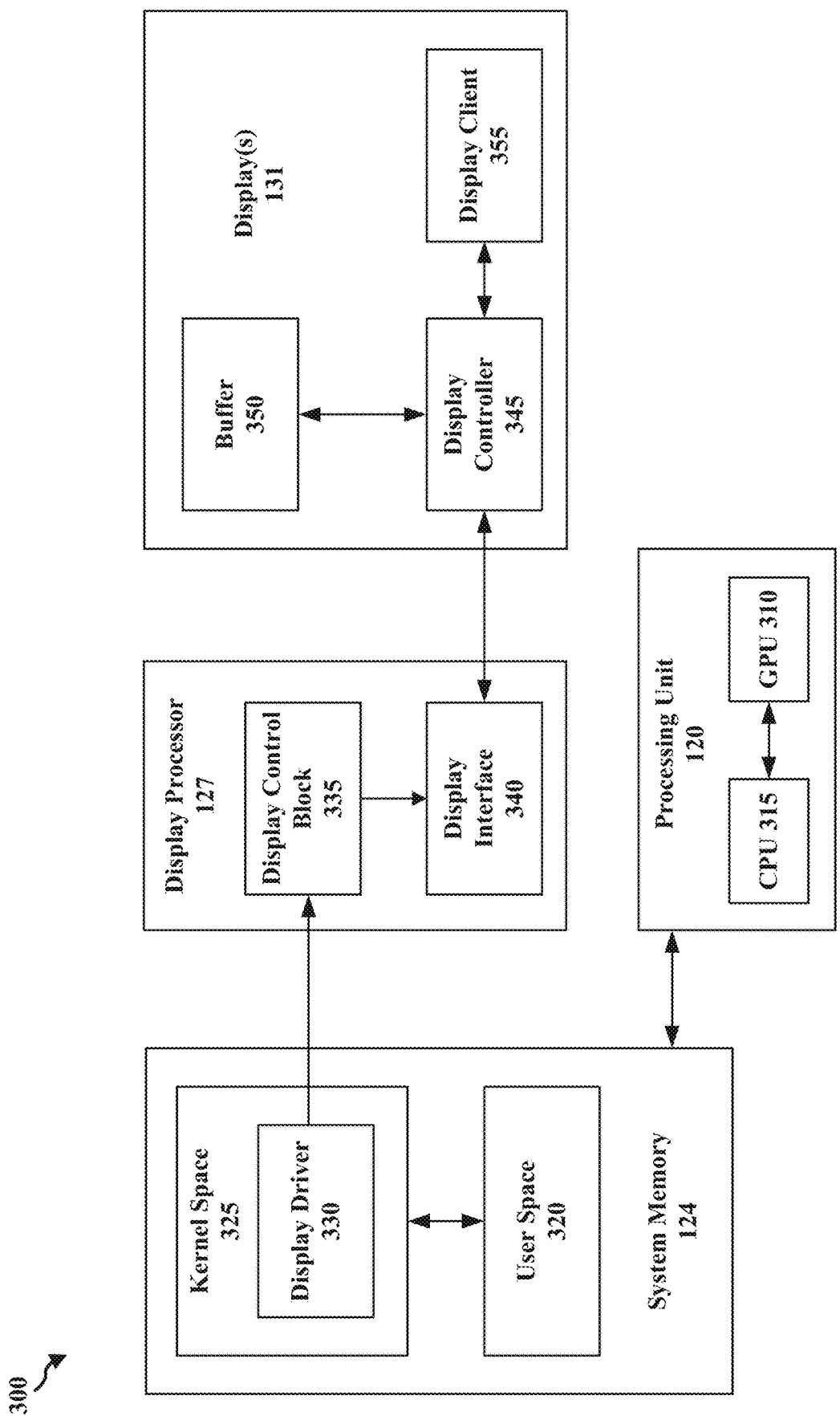
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the exemplary device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
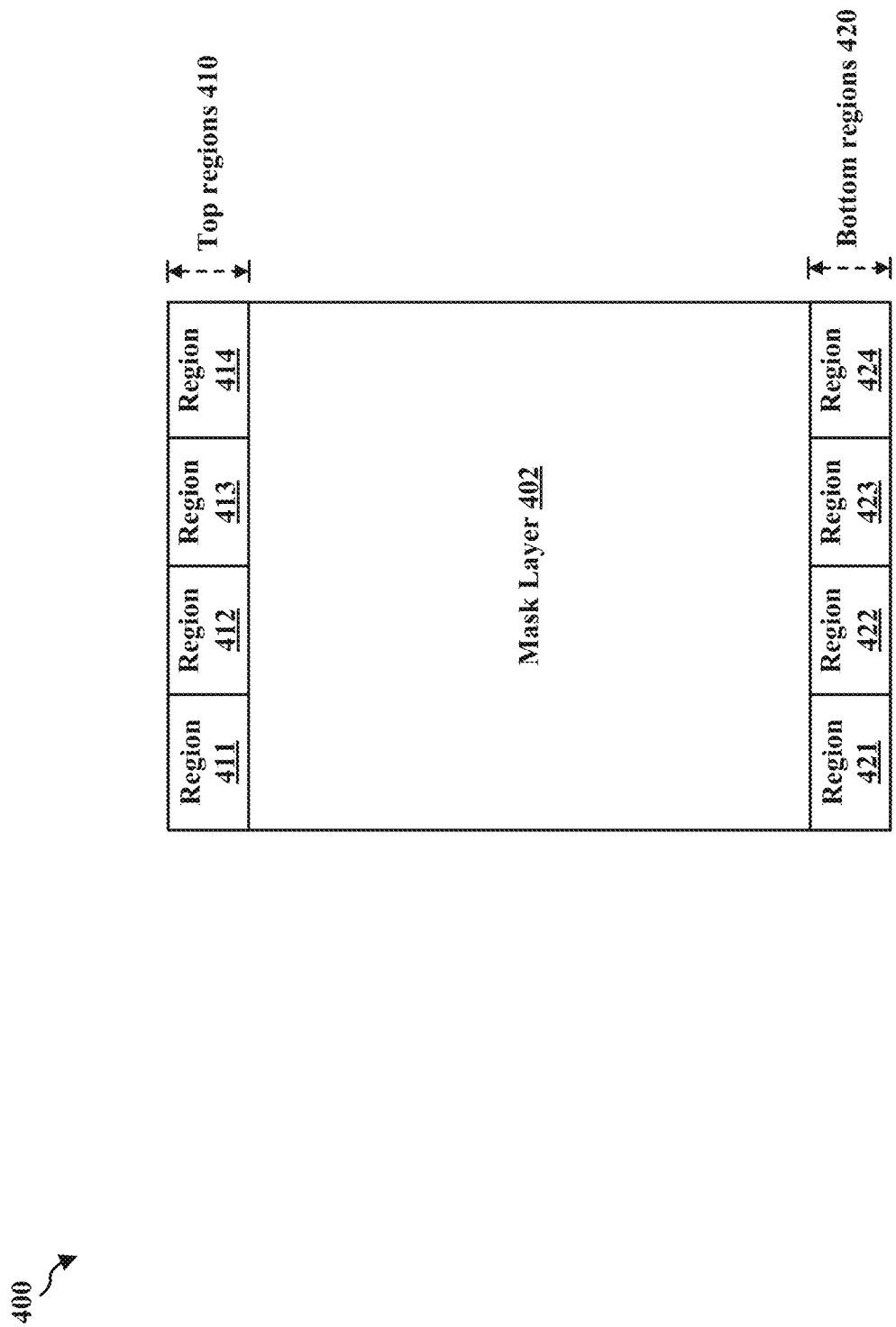
FIG. 4 is a diagram illustrating an example mask layer for display processing.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame. For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Figure 5:
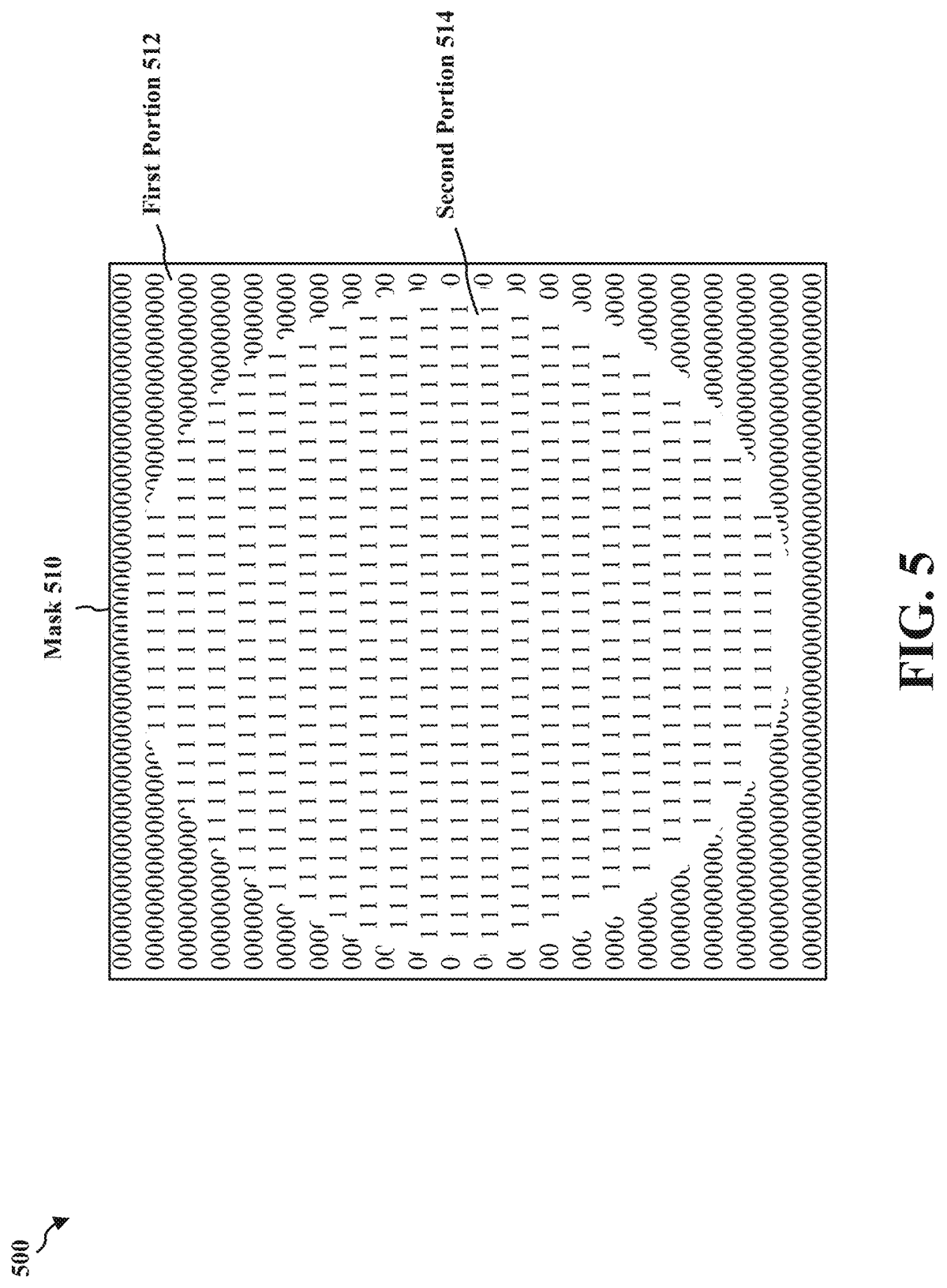

FIG. 5 is a diagram 500 illustrating an example mask for display processing. More specifically, diagram 500 depicts one type of shape mask that is utilized to provide more optimized visual shapes at a display panel. As shown in FIG. 5, diagram 500 depicts mask 510 including first portion 512 and second portion 514. FIG. 5 illustrates that first portion 512 corresponds to a portion including all zero (0) values, while second portion 514 corresponds to a portion including all one (1) values. Accordingly, FIG. 5 depicts that shape masks may include a number of first values (e.g., zero (0) values) and a number of second values (e.g., one (1) values) that are divided into different portions of the mask.

Some types of display processing may utilize certain rendering techniques with mask layers, such as sub-pixel rendering (SPR). Sub-pixel rendering (or subpixel rendering) is a type of rendering that may increase the apparent resolution of a display by rendering pixels to take into account the physical properties of a specific screen type (e.g., liquid crystal display (LCD), light-emitting diode (LED) display, or organic LED (OLED) display). Sub-pixel rendering utilizes the fact that each pixel on a color display is composed of individual red (R), green (G), and blue (B) sub-pixels, or other color sub-pixels, to anti-alias text with improved detail. Sub-pixel rendering may also increase the resolution of certain image types on layouts that are designed to be compatible with sub-pixel rendering.

Figure 6:
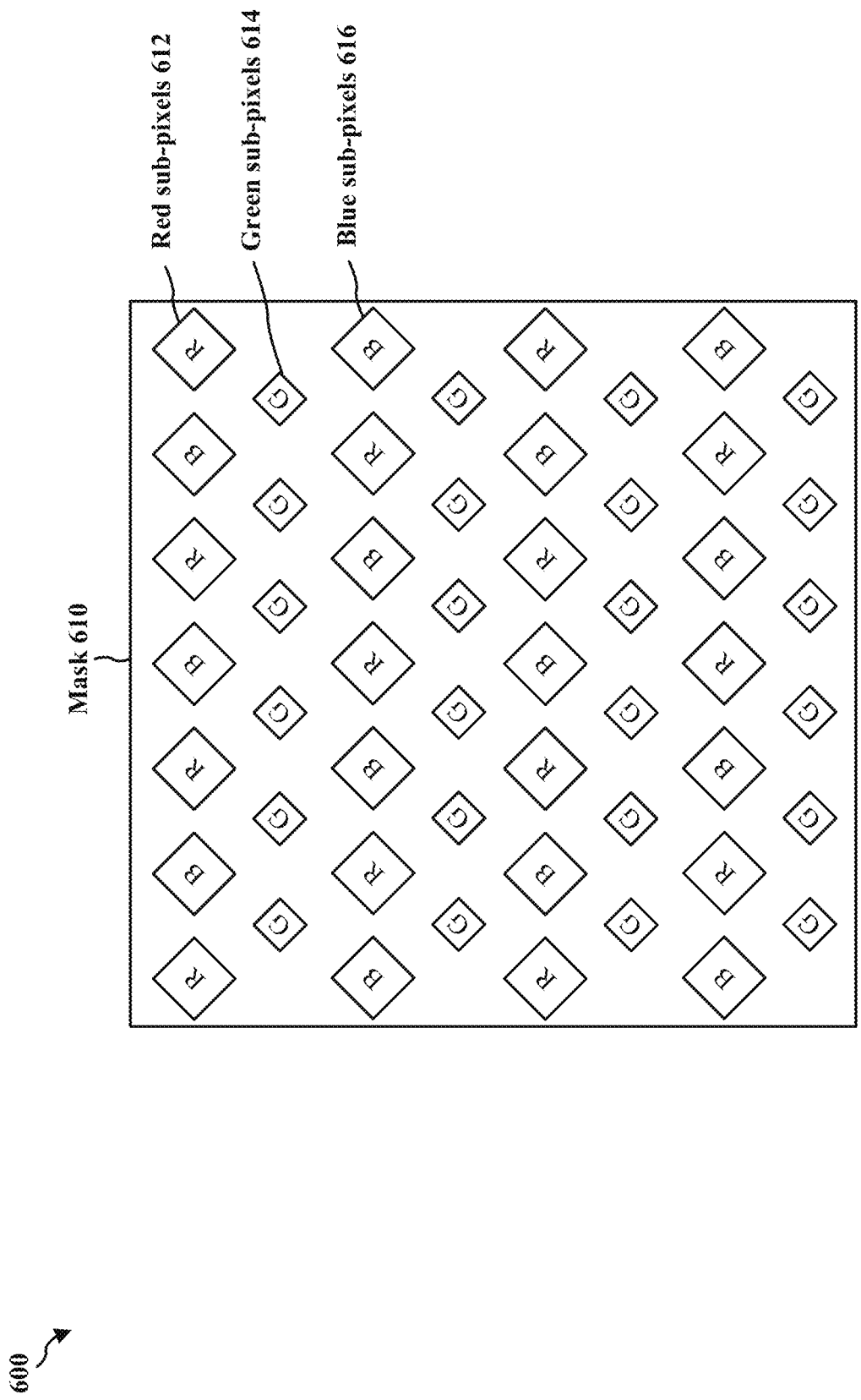
FIG. 6 is a diagram illustrating an example mask for display processing.

FIG. 6 is a diagram 600 illustrating an example mask for display processing. More specifically, diagram 600 depicts one type of mask shape on a physical sub-pixel basis. As shown in FIG. 6, diagram 600 depicts mask 610 including red sub-pixels 612, green sub-pixels 614, and blue sub-pixels 616. FIG. 6 illustrates that the sub-pixels are separated into different colors (e.g., red (R), green (G), and blue (B) sub-pixels) within mask 610. That is, the physical sub-pixel basis of mask 610 depicts the sub-pixels in different colors of the mask.

In some types of display techniques (e.g., techniques for LED displays or OLED displays), certain types of conversion filters (e.g., pixel-to-physical sub-pixel conversion filters) may produce blur artifacts and other artifacts to a basis mask (e.g., a logical pixel basis mask). Also, when designing mask layers, an accurate physical shape may be desired. For example, device user interface (UI) designers and artists may directly define accurate physical shapes with the use of in-house mask layers. However, in some instances, such as for low dots-per-inch (DPI) or points-per-inch (PPI) display devices, the pixel level mask accuracy may not be enough to produce the desired shape accuracy.

Some types of visual effects associated with masks may change along with different filter configurations. For example, display driver integrated circuit (DDIC) hardware round corner (RC) shape mask visual effects may change along with analog sub-pixel rendering (SPR) filter configurations. These types of SPR filters may help to calculate a physical conversion value of a pixel. Additionally, a physical sub-pixel value may change as the SPR filter configuration changes. That is, an SPR filter may be adjusted in order to adjust a physical sub-pixel value. In some aspects, a DDIC analog configuration may cause an error in a hardware round corner shape mask, as well as other types of shape masks.

In some types of pixel conversion, a shape mask may be adjusted along with the adjustment of a filter. For instance, if a logical pixel-to-sub-pixel conversion utilizes complex and flexible filters, the logical pixel basis shape mask may change as the filters are adjusted. That is, some types of shape masks (e.g., display cutout, round corner shape masks) may be based on a logical pixel basis, which may not be ideal from a visual perspective, and may be less than ideal for flexible sub-pixel rendering filters and display driver integrated circuit (DDIC) solutions. As such, adjusting a sub-pixel rendering (SPR) filter may adjust a mask layer shape along with a physical sub-pixel value. This may be a problem as a physical sub-pixel value may be the target of the adjustment, not the mask layer. Also, the presence of the mask may result in an erroneous change to a physical sub-pixel value.

As indicated above, one challenge of implementing mask layers is to prevent an adjustment of the mask layer when adjusting an SPR filter. Accordingly, based on the above, it may be beneficial to adjust an SPR filter without adjusting a mask layer. For instance, it may be beneficial to adjust a physical sub-pixel value and an SPR filter without adjusting a mask layer. It may also be beneficial to include a mask layer without erroneously changing a physical sub-pixel value. Further, it may be beneficial to utilize physical sub-pixel values as a unit of a mask layer.

Aspects of the present disclosure may prevent an adjustment of a mask layer when adjusting a sub-pixel rendering (SPR) filter. That is, aspects of the present disclosure may adjust an SPR filter without adjusting a mask layer. For instance, aspects of the present disclosure may adjust a physical sub-pixel value when adjusting an SPR filter without adjusting a mask layer. Additionally, in some instances, aspects of the present disclosure may provide a mask layer without erroneously changing a physical sub-pixel value. Moreover, aspects of the present disclosure may utilize physical sub-pixel values as a unit of a mask layer. For example, aspects of the present disclosure may utilize a low-level physical sub-pixel as a basic mask unit for a mask layer.

Aspects of the present disclosure may generate a mask layer on a physical sub-pixel basis. For instance, display processing units (DPUs) according to the present disclosure may generate a display shape mask layer on a physical sub-pixel basis. Further, aspects presented herein may perform a run-time adjustment while performing the mask layer generation. For example, DPUs according to aspects presented herein may perform a run-time adjustment while performing the mask layer generation on a physical sub-pixel basis. In some instances, a display shape mask layer may use physical sub-pixels as basic mask units. Also, in some aspects, the shape mask may be designed (e.g., designed in-house by designers/artists) for a target display or a target device.

In some instances, after a mask layer is generated, the mask layer may be saved or stored to a device (e.g., a phone or smart phone). For instance, the generated mask layer may be stored to a device storage or a memory of a device. Also, the mask layer may be saved or stored to a device using a physical sub-pixel format with mask labels and/or mask tags. In some aspects, the mask tag may be one or more of the following values: zero (0), one (1), or alpha (alpha value). For instance, a value of '0' may correspond to the mask layer not being displayed or not being applied to a display. A value of '1' may correspond to the mask layer being fully displayed or fully applied to a display. A value of 'alpha' may correspond to content of the mask layer being multiplied by the alpha value (i.e., partially displayed or partially applied to a display).

Additionally, in some aspects, the mask layer may be loaded to a device storage during a device run-time (i.e., a run-time period). Additionally, the mask layer may be applied to the display as the display shape mask. For instance, by applying the mask layer to the display as the display shape mask, this may produce a desired display shape. The mask layer may also be generated by the device during the run-time period. For example, the mask layer may be generated by the device during the run-time period in order to match a user interface (UI) theme of the device or other devices. Moreover, the mask layer may be adjusted by the device during the run-time period in order to match a UI theme of the device, as well as a UE theme of other devices. This generation and/or adjustment of the mask layer may help to change or adjust a sub-pixel rendering (SPR) value.

Figure 7:
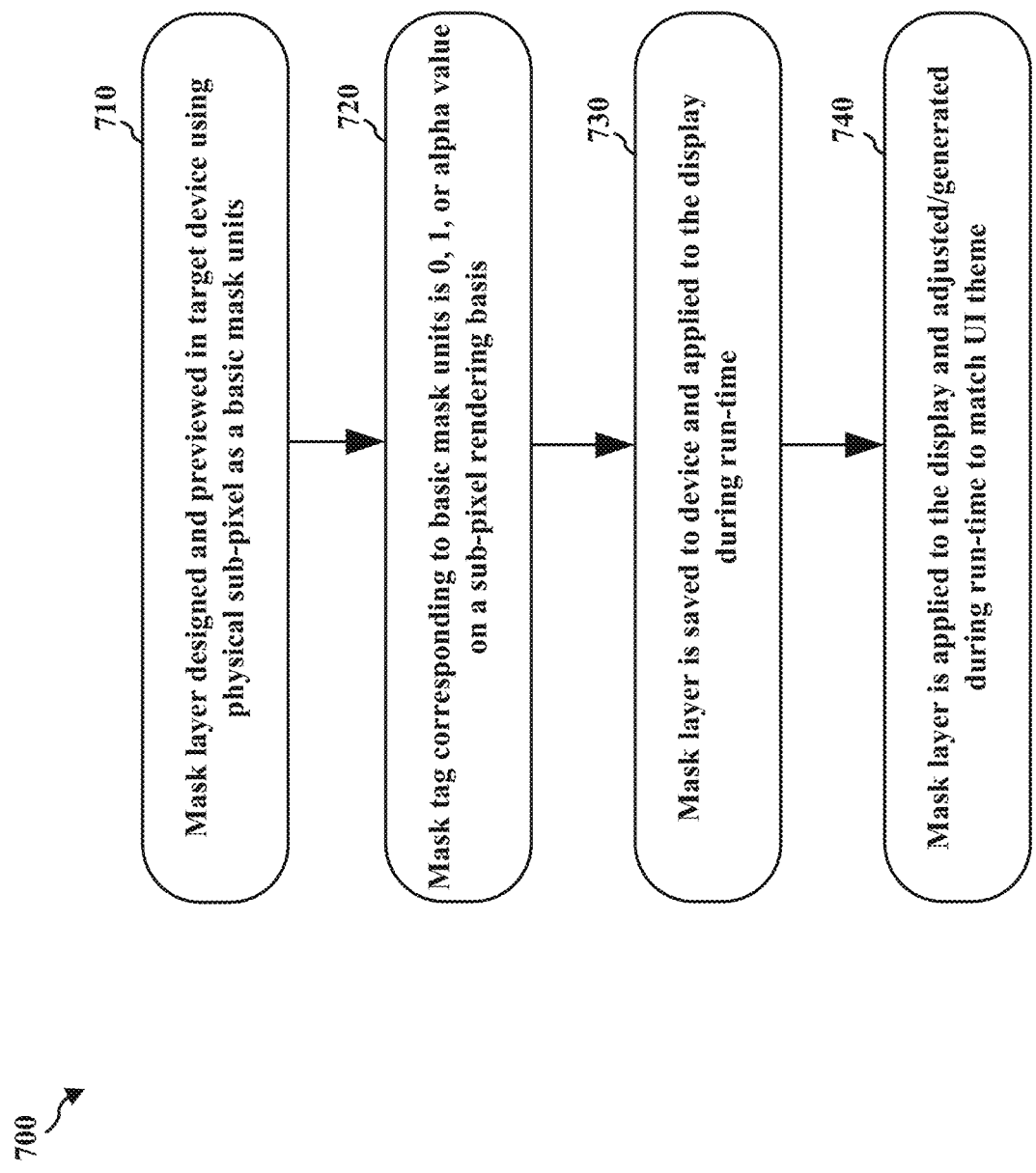
FIG. 7 is a diagram illustrating an example flowchart for display processing.

FIG. 7 is a diagram 700 illustrating an example flowchart for display processing. More specifically, diagram 700 depicts one type of flowchart for mask layer generation on a sub-pixel display basis. The mask layer generation process in FIG. 7 may be performed by a display processor or a device for display processing (e.g., a display processing unit (DPU) or a display driver integrated circuit (DDIC)). As shown in FIG. 7, diagram 700 includes a number of steps, e.g., step 710, step 720, step 730, and step 740. At step 710, a mask layer may be designed and/or previewed at a target device, such as designed and previewed based on a target display configuration. For instance, at step 710, the mask layer may be designed and previewed using physical sub-pixels as basic mask units for the mask layer. The design process may configure the mask layer including a set of basic mask units. In some instances, the DPU or DDIC may utilize a low-level physical sub-pixel as a basic mask unit for the mask layer. At step 720, the basic mask units of the mask layer may correspond to a mask tag. For instance, the mask tag may include a value of zero (0), one (1), or alpha on a sub-pixel rendering basis. At step 730, the mask layer may be saved or stored to a device, such as a device storage. Also, at step 730, the mask layer may be applied to a display during run-time (i.e., a run-time period). Further, at step 730, the mask layer may be retrieved from the device storage during the run-time period. Moreover, at step 730, the target display configuration may be compared to a current display configuration of a display panel. At step 740, the mask layer may be applied to a display during the run-time period. For instance, at step 740, the mask layer may be applied (or not applied) to a display based on the comparison of the target display configuration to the current display configuration. Additionally, at step 740, the mask layer may be adjusted and/or generated during the run-time period. For instance, the mask layer may be adjusted and/or generated during the run-time period to match a user interface (UI) theme of the device, or a UI theme of another device. Also, at step 740, the mask layer may be adjusted and/or generated based on the current display configuration of the display panel.

Figure 8:
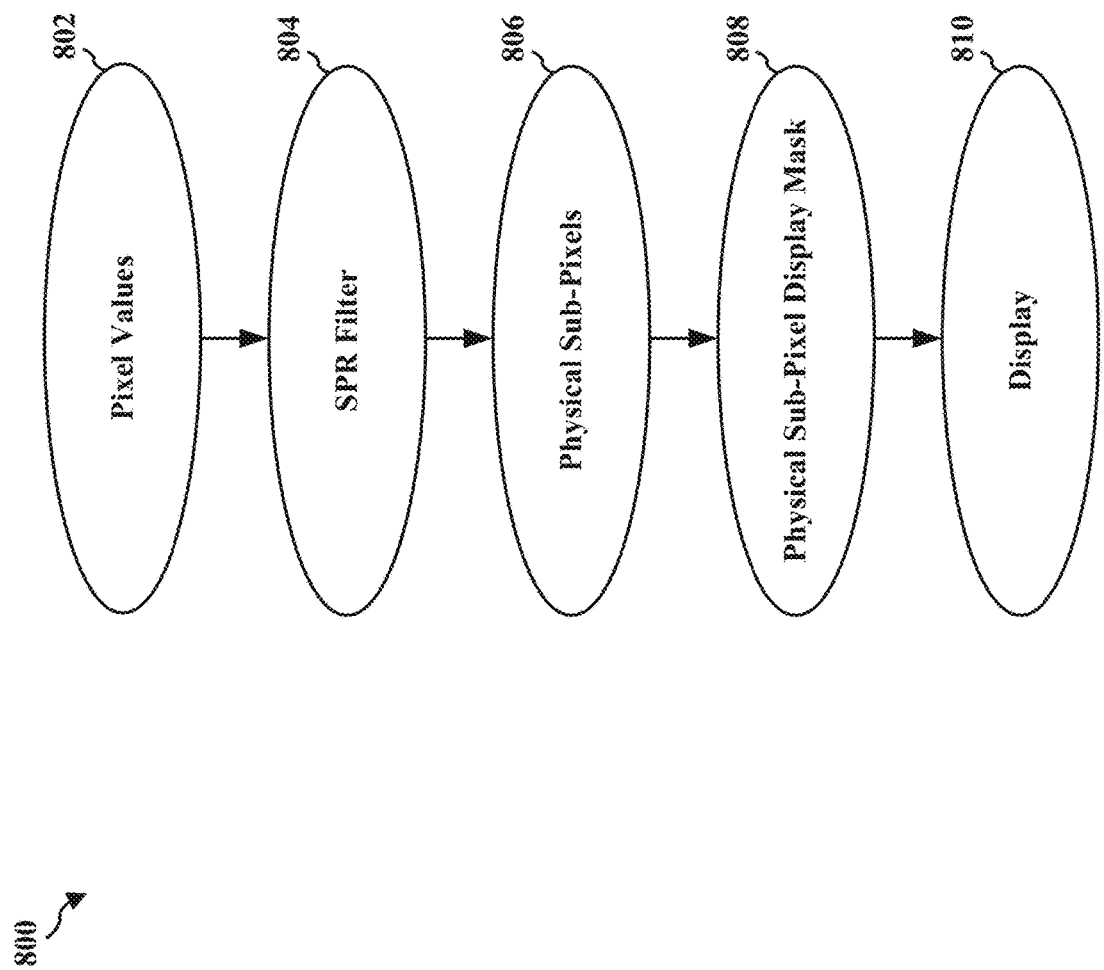
FIG. 8 is a diagram illustrating an example flowchart for display processing.

FIG. 8 is a diagram 800 illustrating another example flowchart for display processing. More specifically, diagram 800 depicts one type of flowchart for mask generation and display on a sub-pixel basis. The mask generation process in FIG. 8 may be performed by a display processor or a device for display processing (e.g., a DPU or a DDIC). As shown in FIG. 8, diagram 800 includes a number of steps, e.g., step 802, step 804, step 806, step 808, and step 810. At step 802, the DPU or DDIC may obtain a set of pixel values or sub-pixel values associated with a set of mask units. At step 804, the DPU or DDIC may configure a sub-pixel rendering (SPR) filter based on the set of pixel values or sub-pixel values. At step 806, the DPU or DDIC may adjust the set of pixel values or sub-pixel values to a set of physical sub-pixel values. At step 808, the DPU or DDIC may configure a display mask on a physical sub-pixel basis. For instance, the DPU or DDIC may configure a physical sub-pixel display mask based on the set of physical sub-pixel values. At step 810, the DPU or DDIC may apply the physical sub-pixel display mask to a display or display panel. For example, the DPU or DDIC may transmit the physical sub-pixel display mask to a display.

Aspects of the present disclosure may include a number of benefits or advantages. For instance, aspects of the present disclosure may de-couple sub-pixel rendering (SPR) filters with a display shape mask. By doing so, the SPR filters may not affect or adjust display shape masks. Aspects presented herein may also be compatible with a wide variety of display shape masks (e.g., logical pixel basis display shape masks), so there may be no visual regression in a wide variety of display scenarios. Further, aspects presented herein may improve or optimize visual accuracy for complex display panel shapes. In some instances, by utilizing aspects presented herein, a user interface (UI) designer may accurately control the accuracy of the display shape. Moreover, aspects presented herein may provide a DDIC-based display mask optimized solution. For some types of displays (e.g., complex physical SPR filter displays), aspects presented herein may prevent SPR filters from affecting display shapes and/or display edges.

Figure 9:
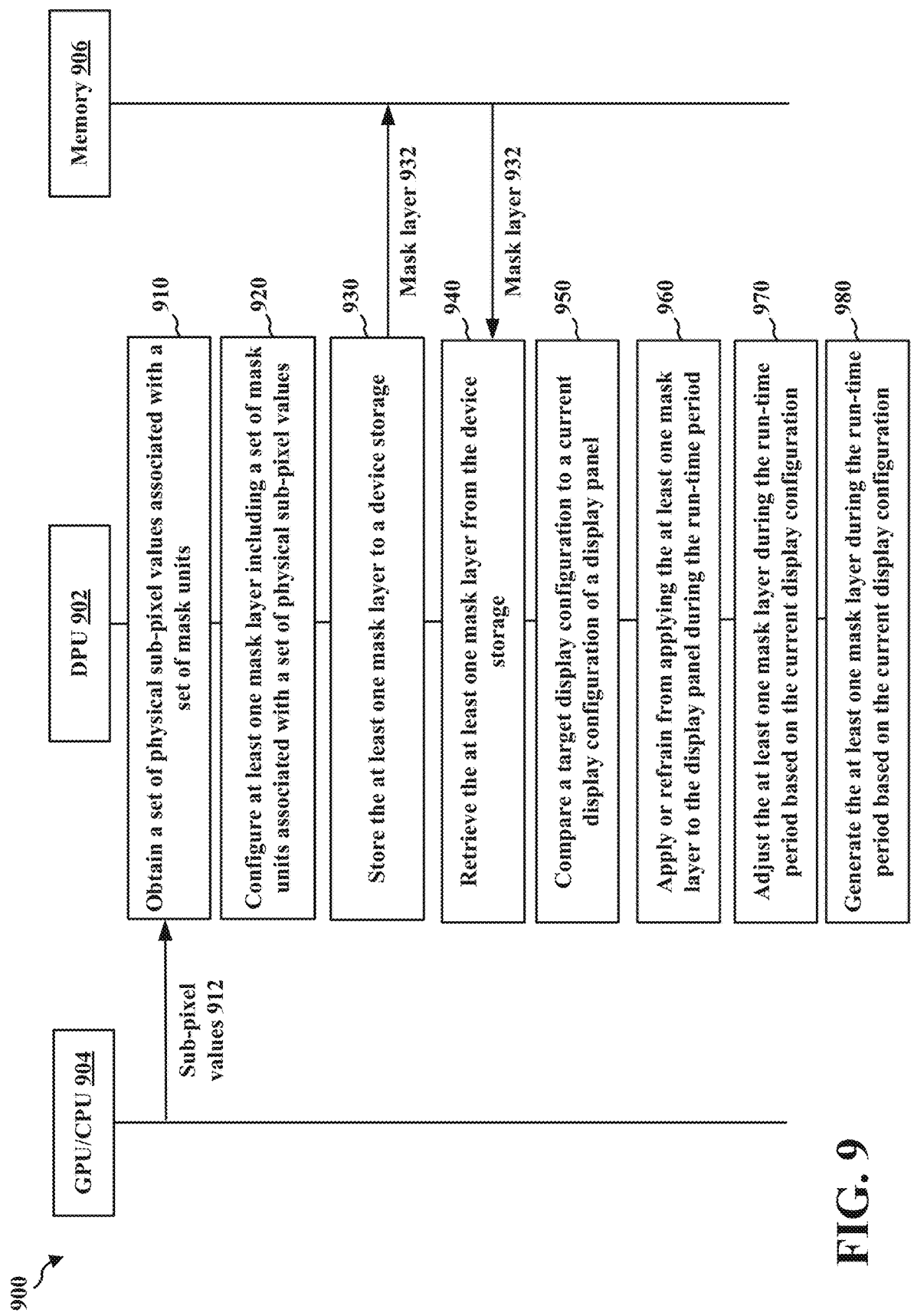
FIG. 9 is a communication flow diagram illustrating example communications between a GPU/CPU, a DPU, and a memory.

FIG. 9 is a communication flow diagram 900 of display processing in accordance with one or more techniques of this disclosure. As shown in FIG. 9, diagram 900 includes example communications between DPU 902 (or other display processor), GPU/CPU 904, and memory 906 (e.g., a device storage), in accordance with one or more techniques of this disclosure.

At 910, DPU 902 may obtain a set of physical sub-pixel values associated with a set of mask units (e.g., obtain sub-pixel values 912 from GPU/CPU 904), where the set of physical sub-pixel values is obtained prior to configuring at least one mask layer.

At 920, DPU 902 may configure at least one mask layer including a set of mask units, the set of mask units being associated with a set of physical sub-pixel values, the at least one mask layer being configured based on a target display configuration. The set of mask units of the at least one mask layer may correspond to at least one mask tag. Also, a value of the at least one mask tag may be one or more of: zero (0), one (1), or alpha. Further, the set of mask units may be a set of basic mask units, and the set of physical sub-pixel values may be associated with a set of sub-pixel rendering (SPR) values. In some aspects, configuring the at least one mask layer including the set of mask units may include: designing the at least one mask layer including the set of mask units, where the at least one mask layer may be designed prior to storing the at least one mask layer to the device storage. The at least one mask layer may be configured by a display processing unit (DPU) or a display driver integrated circuit (DDIC).

At 930, DPU 902 may store, upon configuring the at least one mask layer, the at least one mask layer to a device storage of a device (e.g., store mask layer 932 to memory 906). In some aspects, storing the at least one mask layer to the device storage may include: transmitting the at least one mask layer to the device storage. The device storage may be at least one of: a panel storage, a display driver storage, a user interface (UI) storage, an application storage, or a hardware storage.

At 940, DPU 902 may retrieve the at least one mask layer from the device storage during a run-time period after the at least one mask layer is stored (e.g., retrieve mask layer 932 from memory 906). The run-time period may correspond to a device run-time of the device or a panel run-time of the display panel.

At 950, DPU 902 may compare the target display configuration to a current display configuration of a display panel.

At 960, DPU 902 may apply or refrain from applying the at least one mask layer to the display panel during the run-time period based on the comparison of the target display configuration to the current display configuration. The at least one mask layer may be applied or refrained from being applied based on a value of the set of mask units. In some aspects, if the value of the set of mask units is zero (0), the at least one mask layer may be refrained from being applied to the display panel. Also, if the value of the set of mask units is one (1), the at least one mask layer may be fully applied to the display panel. Further, if the value of the set of mask units is alpha, the at least one mask layer may be at least partially applied to the display panel. Additionally, the at least one mask layer may be applied or refrained from being applied to one or more physical sub-pixel values of the display panel. In some aspects, applying the at least one mask layer to the display panel may include: transmitting the at least one mask layer to the display panel.

At 970, DPU 902 may adjust, upon applying or refraining from applying the at least one mask layer to the display panel, the at least one mask layer during the run-time period based on the current display configuration. In some aspects, adjusting the at least one mask layer may adjust at least one physical sub-pixel value of the set of physical sub-pixel values associated with the set of mask units. Also, the at least one mask layer may be adjusted or generated during the run-time period to match a user interface (UI) theme of the device.

At 980, DPU 902 may generate, upon applying or refraining from applying the at least one mask layer to the display panel, the at least one mask layer during the run-time period based on the current display configuration.

Figure 10:
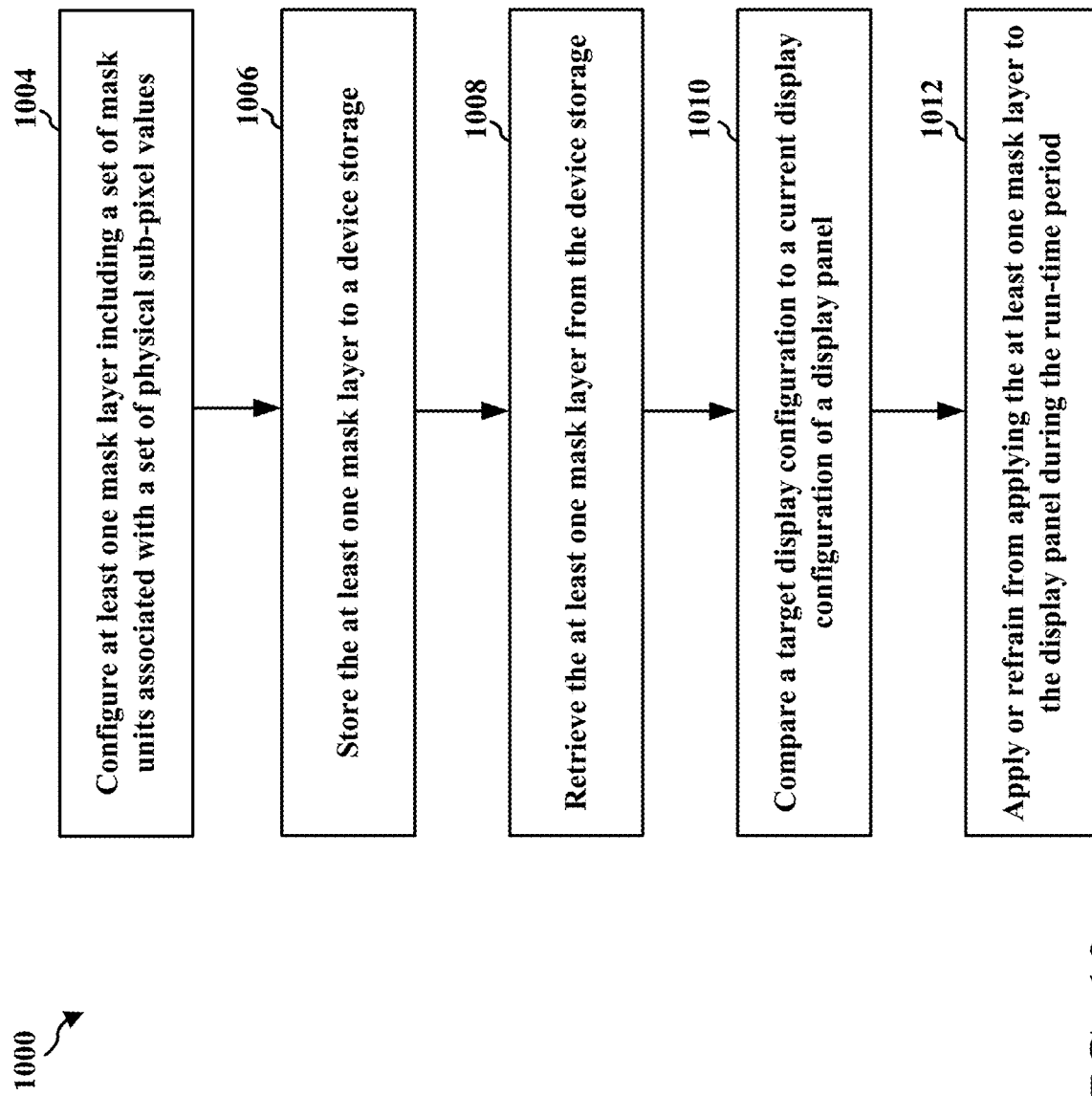
FIG. 10 is a flowchart of an example method of display processing.

FIG. 10 is a flowchart 1000 of an example method of display processing in accordance with one or more techniques of this disclosure. The method may be performed by a DPU, a DDIC, an apparatus for display processing, a display processor, a wireless communication device, and/or any apparatus that may perform display processing as used in connection with the examples of FIGS. 1-9.

At 1004, the DPU may configure at least one mask layer including a set of mask units, the set of mask units being associated with a set of physical sub-pixel values, the at least one mask layer being configured based on a target display configuration, as described in connection with the examples in FIGS. 1-9. For example, as described in 920 of FIG. 9, DPU 902 may configure at least one mask layer including a set of mask units, the set of mask units being associated with a set of physical sub-pixel values, the at least one mask layer being configured based on a target display configuration. Further, step 1004 may be performed by display processor 127 in FIG. 1. The set of mask units of the at least one mask layer may correspond to at least one mask tag. Also, a value of the at least one mask tag may be one or more of: zero (0), one (1), or alpha. Further, the set of mask units may be a set of basic mask units, and the set of physical sub-pixel values may be associated with a set of sub-pixel rendering (SPR) values. In some aspects, configuring the at least one mask layer including the set of mask units may include: designing the at least one mask layer including the set of mask units, where the at least one mask layer may be designed prior to storing the at least one mask layer to the device storage. The at least one mask layer may be configured by a display processing unit (DPU) or a display driver integrated circuit (DDIC).

At 1006, the DPU may store, upon configuring the at least one mask layer, the at least one mask layer to a device storage of a device, as described in connection with the examples in FIGS. 1-9. For example, as described in 930 of FIG. 9, DPU 902 may store, upon configuring the at least one mask layer, the at least one mask layer to a device storage of a device. Further, step 1006 may be performed by display processor 127 in FIG. 1. In some aspects, storing the at least one mask layer to the device storage may include: transmitting the at least one mask layer to the device storage. The device storage may be at least one of: a panel storage, a display driver storage, a user interface (UI) storage, an application storage, or a hardware storage.

At 1008, the DPU may retrieve the at least one mask layer from the device storage during a run-time period after the at least one mask layer is stored, as described in connection with the examples in FIGS. 1-9. For example, as described in 940 of FIG. 9, DPU 902 may retrieve the at least one mask layer from the device storage during a run-time period after the at least one mask layer is stored. Further, step 1008 may be performed by display processor 127 in FIG. 1. The run-time period may correspond to a device run-time of the device or a panel run-time of the display panel.

At 1010, the DPU may compare the target display configuration to a current display configuration of a display panel, as described in connection with the examples in FIGS. 1-9. For example, as described in 950 of FIG. 9, DPU 902 may compare the target display configuration to a current display configuration of a display panel. Further, step 1010 may be performed by display processor 127 in FIG. 1.

At 1012, the DPU may apply or refrain from applying the at least one mask layer to the display panel during the run-time period based on the comparison of the target display configuration to the current display configuration, as described in connection with the examples in FIGS. 1-9. For example, as described in 960 of FIG. 9, DPU 902 may apply or refrain from applying the at least one mask layer to the display panel during the run-time period based on the comparison of the target display configuration to the current display configuration. Further, step 1012 may be performed by display processor 127 in FIG. 1. The at least one mask layer may be applied or refrained from being applied based on a value of the set of mask units. In some aspects, if the value of the set of mask units is zero (0), the at least one mask layer may be refrained from being applied to the display panel. Also, if the value of the set of mask units is one (1), the at least one mask layer may be fully applied to the display panel. Further, if the value of the set of mask units is alpha, the at least one mask layer may be at least partially applied to the display panel. Additionally, the at least one mask layer may be applied or refrained from being applied to one or more physical sub-pixel values of the display panel. In some aspects, applying the at least one mask layer to the display panel may include: transmitting the at least one mask layer to the display panel.

Figure 11:
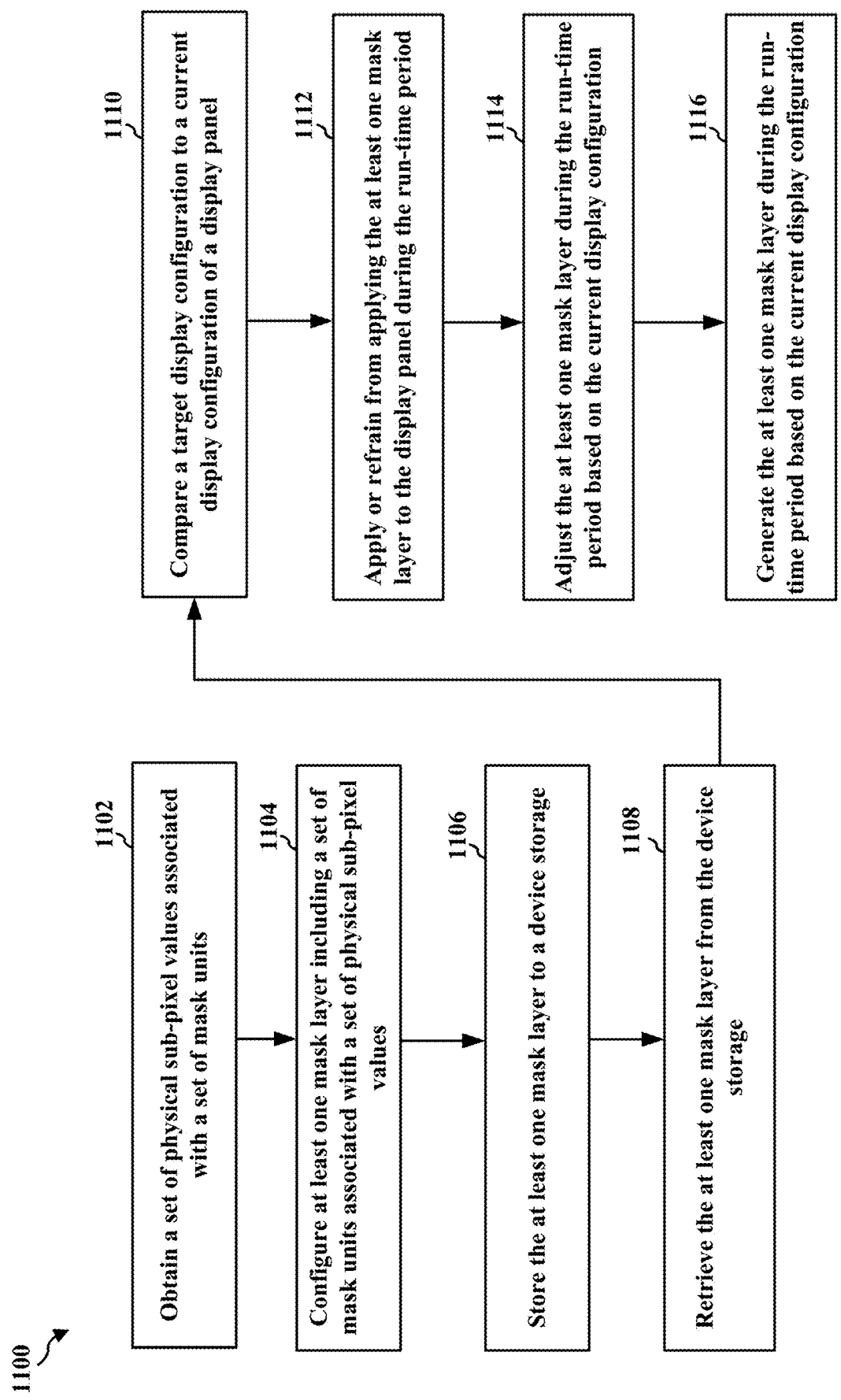
FIG. 11 is a flowchart of an example method of display processing.

FIG. 11 is a flowchart 1100 of an example method of display processing in accordance with one or more techniques of this disclosure. The method may be performed by a DPU, a DDIC, an apparatus for display processing, a display processor, a wireless communication device, and/or any apparatus that may perform display processing as used in connection with the examples of FIGS. 1-9.

At 1102, the DPU may obtain a set of physical sub-pixel values associated with a set of mask units, where the set of physical sub-pixel values is obtained prior to configuring at least one mask layer, as described in connection with the examples in FIGS. 1-9. For example, as described in 910 of FIG. 9, DPU 902 may obtain a set of physical sub-pixel values associated with a set of mask units, where the set of physical sub-pixel values is obtained prior to configuring at least one mask layer. Further, step 1102 may be performed by display processor 127 in FIG. 1.

At 1104, the DPU may configure at least one mask layer including a set of mask units, the set of mask units being associated with a set of physical sub-pixel values, the at least one mask layer being configured based on a target display configuration, as described in connection with the examples in FIGS. 1-9. For example, as described in 920 of FIG. 9, DPU 902 may configure at least one mask layer including a set of mask units, the set of mask units being associated with a set of physical sub-pixel values, the at least one mask layer being configured based on a target display configuration. Further, step 1104 may be performed by display processor 127 in FIG. 1. The set of mask units of the at least one mask layer may correspond to at least one mask tag. Also, a value of the at least one mask tag may be one or more of: zero (0), one (1), or alpha. Further, the set of mask units may be a set of basic mask units, and the set of physical sub-pixel values may be associated with a set of sub-pixel rendering (SPR) values. In some aspects, configuring the at least one mask layer including the set of mask units may include: designing the at least one mask layer including the set of mask units, where the at least one mask layer may be designed prior to storing the at least one mask layer to the device storage. The at least one mask layer may be configured by a display processing unit (DPU) or a display driver integrated circuit (DDIC).

At 1106, the DPU may store, upon configuring the at least one mask layer, the at least one mask layer to a device storage of a device, as described in connection with the examples in FIGS. 1-9. For example, as described in 930 of FIG. 9, DPU 902 may store, upon configuring the at least one mask layer, the at least one mask layer to a device storage of a device. Further, step 1106 may be performed by display processor 127 in FIG. 1. In some aspects, storing the at least one mask layer to the device storage may include: transmitting the at least one mask layer to the device storage. The device storage may be at least one of: a panel storage, a display driver storage, a user interface (UI) storage, an application storage, or a hardware storage.

At 1108, the DPU may retrieve the at least one mask layer from the device storage during a run-time period after the at least one mask layer is stored, as described in connection with the examples in FIGS. 1-9. For example, as described in 940 of FIG. 9, DPU 902 may retrieve the at least one mask layer from the device storage during a run-time period after the at least one mask layer is stored. Further, step 1108 may be performed by display processor 127 in FIG. 1. The run-time period may correspond to a device run-time of the device or a panel run-time of the display panel.

At 1110, the DPU may compare the target display configuration to a current display configuration of a display panel, as described in connection with the examples in FIGS. 1-9. For example, as described in 950 of FIG. 9, DPU 902 may compare the target display configuration to a current display configuration of a display panel. Further, step 1110 may be performed by display processor 127 in FIG. 1.

At 1112, the DPU may apply or refrain from applying the at least one mask layer to the display panel during the run-time period based on the comparison of the target display configuration to the current display configuration, as described in connection with the examples in FIGS. 1-9. For example, as described in 960 of FIG. 9, DPU 902 may apply or refrain from applying the at least one mask layer to the display panel during the run-time period based on the comparison of the target display configuration to the current display configuration. Further, step 1112 may be performed by display processor 127 in FIG. 1. The at least one mask layer may be applied or refrained from being applied based on a value of the set of mask units. In some aspects, if the value of the set of mask units is zero (0), the at least one mask layer may be refrained from being applied to the display panel. Also, if the value of the set of mask units is one (1), the at least one mask layer may be fully applied to the display panel. Further, if the value of the set of mask units is alpha, the at least one mask layer may be at least partially applied to the display panel. Additionally, the at least one mask layer may be applied or refrained from being applied to one or more physical sub-pixel values of the display panel. In some aspects, applying the at least one mask layer to the display panel may include: transmitting the at least one mask layer to the display panel.

At 1114, the DPU may adjust, upon applying or refraining from applying the at least one mask layer to the display panel, the at least one mask layer during the run-time period based on the current display configuration, as described in connection with the examples in FIGS. 1-9. For example, as described in 970 of FIG. 9, DPU 902 may adjust, upon applying or refraining from applying the at least one mask layer to the display panel, the at least one mask layer during the run-time period based on the current display configuration. Further, step 1114 may be performed by display processor 127 in FIG. 1. In some aspects, adjusting the at least one mask layer may adjust at least one physical sub-pixel value of the set of physical sub-pixel values associated with the set of mask units. Also, the at least one mask layer may be adjusted or generated during the run-time period to match a user interface (UI) theme of the device.

At 1116, the DPU may generate, upon applying or refraining from applying the at least one mask layer to the display panel, the at least one mask layer during the run-time period based on the current display configuration, as described in connection with the examples in FIGS. 1-9. For example, as described in 980 of FIG. 9, DPU 902 may generate, upon applying or refraining from applying the at least one mask layer to the display panel, the at least one mask layer during the run-time period based on the current display configuration. Further, step 1116 may be performed by display processor 127 in FIG. 1.

In configurations, a method or an apparatus for display processing is provided. The apparatus may be a DPU, a DDIC, a display processor, or some other processor that may perform display processing. In aspects, the apparatus may be the display processor 127 within the device 104, or may be some other hardware within the device 104 or another device. The apparatus, e.g., display processor 127, may include means for configuring at least one mask layer including a set of mask units, the set of mask units being associated with a set of physical sub-pixel values, the at least one mask layer being configured based on a target display configuration; means for storing, upon configuring the at least one mask layer, the at least one mask layer to a device storage of a device; means for retrieving the at least one mask layer from the device storage during a run-time period after the at least one mask layer is stored; means for comparing the target display configuration to a current display configuration of a display panel; means for applying or refraining from applying the at least one mask layer to the display panel during the run-time period based on the comparison of the target display configuration to the current display configuration; means for adjusting, upon applying or refraining from applying the at least one mask layer to the display panel, the at least one mask layer during the run-time period based on the current display configuration; means for generating, upon applying or refraining from applying the at least one mask layer to the display panel, the at least one mask layer during the run-time period based on the current display configuration; and means for obtaining the set of physical sub-pixel values associated with the set of mask units, where the set of physical sub-pixel values is obtained prior to configuring the at least one mask layer.

The subject matter described herein may be implemented to realize one or more benefits or advantages. For instance, the described display processing techniques may be used by a DPU, a display processor, or some other processor that may perform display processing to implement the mask layer generation techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize mask layer generation techniques in order to improve memory bandwidth efficiency and/or increase processing speed at a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing including at least one processor coupled to a memory and configured to: configure at least one mask layer including a set of mask units, the set of mask units being associated with a set of physical sub-pixel values, the at least one mask layer being configured based on a target display configuration; store, upon configuring the at least one mask layer, the at least one mask layer to a device storage of a device; retrieve the at least one mask layer from the device storage during a run-time period after the at least one mask layer is stored; compare the target display configuration to a current display configuration of a display panel; and apply or refrain from applying the at least one mask layer to the display panel during the run-time period based on the comparison of the target display configuration to the current display configuration.

Aspect 2 is the apparatus of aspect 1, where the at least one mask layer is applied or refrained from being applied based on a value of the set of mask units.

Aspect 3 is the apparatus of any of aspects 1 and 2, where, if the value of the set of mask units is zero (0), the at least one mask layer is refrained from being applied to the display panel.

Aspect 4 is the apparatus of any of aspects 1 to 3, where, if the value of the set of mask units is one (1), the at least one mask layer is fully applied to the display panel; and where, if the value of the set of mask units is alpha, the at least one mask layer is at least partially applied to the display panel.

Aspect 5 is the apparatus of any of aspects 1 to 4, where the at least one processor is further configured to: adjust, upon applying or refraining from applying the at least one mask layer to the display panel, the at least one mask layer during the run-time period based on the current display configuration.

Aspect 6 is the apparatus of any of aspects 1 to 5, where adjusting the at least one mask layer adjusts at least one physical sub-pixel value of the set of physical sub-pixel values associated with the set of mask units.

Aspect 7 is the apparatus of any of aspects 1 to 6, where the at least one mask layer is adjusted or generated during the run-time period to match a user interface (UI) theme of the device.

Aspect 8 is the apparatus of any of aspects 1 to 7, where the at least one processor is further configured to: generate, upon applying or refraining from applying the at least one mask layer to the display panel, the at least one mask layer during the run-time period based on the current display configuration.

Aspect 9 is the apparatus of any of aspects 1 to 8, where the set of mask units of the at least one mask layer corresponds to at least one mask tag.

Aspect 10 is the apparatus of any of aspects 1 to 9, where a value of the at least one mask tag is one or more of: zero (0), one (1), or alpha.

Aspect 11 is the apparatus of any of aspects 1 to 10, where the at least one processor is further configured to: obtain the set of physical sub-pixel values associated with the set of mask units, where the set of physical sub-pixel values is obtained prior to configuring the at least one mask layer.

Aspect 12 is the apparatus of any of aspects 1 to 11, where the set of mask units is a set of basic mask units, and the set of physical sub-pixel values is associated with a set of sub-pixel rendering (SPR) values.

Aspect 13 is the apparatus of any of aspects 1 to 12, where the at least one mask layer is applied or refrained from being applied to one or more physical sub-pixel values of the display panel.

Aspect 14 is the apparatus of any of aspects 1 to 13, where to configure the at least one mask layer, the at least one processor is configured to: design the at least one mask layer including the set of mask units, where the at least one mask layer is designed prior to storing the at least one mask layer to the device storage.

Aspect 15 is the apparatus of any of aspects 1 to 14, where to store the at least one mask layer to the device storage, the at least one processor is configured to: transmit the at least one mask layer to the device storage; and where to apply the at least one mask layer to the display panel, the at least one processor is configured to: transmit the at least one mask layer to the display panel.

Aspect 16 is the apparatus of any of aspects 1 to 15, where the run-time period corresponds to a device run-time of the device or a panel run-time of the display panel.

Aspect 17 is the apparatus of any of aspects 1 to 16, where the device storage is at least one of: a panel storage, a display driver storage, a user interface (UI) storage, an application storage, or a hardware storage.

Aspect 18 is the apparatus of any of aspects 1 to 17, where the at least one mask layer is configured by a display processing unit (DPU) or a display driver integrated circuit (DDIC).

Aspect 19 is the apparatus of any of aspects 1 to 18, where the apparatus is a wireless communication device, further including at least one of an antenna or a transceiver coupled to the at least one processor.

Aspect 20 is a method of display processing for implementing any of aspects 1 to 19.

Aspect 21 is an apparatus for display processing including means for implementing any of aspects 1 to 19.

Aspect 22 is a non-transitory computer-readable medium storing computer executable code, the code when executed by at least one processor causes the at least one processor to implement any of aspects 1 to 19.

What is claimed is:

1. An apparatus for display processing, comprising:
a memory; and
at least one processor coupled to the memory and configured to:
configure at least one mask layer including a set of mask units, the set of mask units being associated with a set of physical sub-pixel values, the at least one mask layer being configured based on a target display configuration;

store, upon configuring the at least one mask layer, the at least one mask layer to a device storage of a device;

retrieve the at least one mask layer from the device storage during a run-time period after the at least one mask layer is stored;

compare the target display configuration to a current display configuration of a display panel; and apply or refrain from applying the at least one mask layer to the display panel during the run-time period based on the comparison of the target display configuration to the current display configuration.

2. The apparatus of claim 1, wherein the at least one mask layer is applied or refrained from being applied based on a value of the set of mask units.

3. The apparatus of claim 2, wherein, if the value of the set of mask units is zero (0), the at least one mask layer is refrained from being applied to the display panel.

4. The apparatus of claim 2, wherein, if the value of the set of mask units is one (1), the at least one mask layer is fully applied to the display panel; and wherein, if the value of the set of mask units is alpha, the at least one mask layer is at least partially applied to the display panel.

5. The apparatus of claim 1, wherein the at least one processor is further configured to:

adjust, upon applying or refraining from applying the at least one mask layer to the display panel, the at least one mask layer during the run-time period based on the current display configuration.

6. The apparatus of claim 5, wherein adjusting the at least one mask layer adjusts at least one physical sub-pixel value of the set of physical sub-pixel values associated with the set of mask units.

7. The apparatus of claim 5, wherein the at least one mask layer is adjusted or generated during the run-time period to match a user interface (UI) theme of the device.

8. The apparatus of claim 1, wherein the at least one processor is further configured to:

generate, upon applying or refraining from applying the at least one mask layer to the display panel, the at least one mask layer during the run-time period based on the current display configuration.

9. The apparatus of claim 1, wherein the set of mask units of the at least one mask layer corresponds to at least one mask tag.

10. The apparatus of claim 9, wherein a value of the at least one mask tag is one or more of: zero (0), one (1), or alpha.

11. The apparatus of claim 1, wherein the at least one processor is further configured to:

obtain the set of physical sub-pixel values associated with the set of mask units, wherein the set of physical sub-pixel values is obtained prior to configuring the at least one mask layer.

12. The apparatus of claim 1, wherein the set of mask units is a set of basic mask units, and the set of physical sub-pixel values is associated with a set of sub-pixel rendering (SPR) values.

13. The apparatus of claim 1, wherein the at least one mask layer is applied or refrained from being applied to one or more physical sub-pixel values of the display panel.

14. The apparatus of claim 1, wherein to configure the at least one mask layer, the at least one processor is configured to: design the at least one mask layer including the set of mask units, wherein the at least one mask layer is designed prior to storing the at least one mask layer to the device storage.

15. The apparatus of claim 1, wherein to store the at least one mask layer to the device storage, the at least one processor is configured to: transmit the at least one mask layer to the device storage; and wherein to apply the at least one mask layer to the display panel, the at least one processor is configured to: transmit the at least one mask layer to the display panel.

16. The apparatus of claim 1, wherein the run-time period corresponds to a device run-time of the device or a panel run-time of the display panel.

17. The apparatus of claim 1, wherein the device storage is at least one of: a panel storage, a display driver storage, a user interface (UI) storage, an application storage, or a hardware storage.

18. The apparatus of claim 1, wherein the at least one mask layer is configured by a display processing unit (DPU) or a display driver integrated circuit (DDIC), and wherein the apparatus is a wireless communication device, further comprising at least one of an antenna or a transceiver coupled to the at least one processor.

19. A method of display processing, comprising:

configuring at least one mask layer including a set of mask units, the set of mask units being associated with a set of physical sub-pixel values, the at least one mask layer being configured based on a target display configuration;

storing, upon configuring the at least one mask layer, the at least one mask layer to a device storage of a device;

retrieving the at least one mask layer from the device storage during a run-time period after the at least one mask layer is stored;

comparing the target display configuration to a current display configuration of a display panel; and applying or refraining from applying the at least one mask layer to the display panel during the run-time period based on the comparison of the target display configuration to the current display configuration.

20. The method of claim 19, wherein the at least one mask layer is applied or refrained from being applied based on a value of the set of mask units;

wherein, if the value of the set of mask units is zero (0), the at least one mask layer is refrained from being applied to the display panel; wherein, if the value of the set of mask units is one (1), the at least one mask layer is fully applied to the display panel;

wherein, if the value of the set of mask units is alpha, the at least one mask layer is at least partially applied to the display panel.

21. The method of claim 19, further comprising:

adjusting or generating, upon applying or refraining from applying the at least one mask layer to the display panel, the at least one mask layer during the run-time period based on the current display configuration.

22. The method of claim 21, wherein adjusting the at least one mask layer adjusts at least one physical sub-pixel value of the set of physical sub-pixel values associated with the set of mask units, wherein the at least one mask layer is adjusted or generated during the run-time period to match a user interface (UI) theme of the device.

23. The method of claim 19, wherein the set of mask units of the at least one mask layer corresponds to at least one mask tag, wherein a value of the at least one mask tag is one or more of: zero (0), one (1), or alpha.

24. The method of claim 19, further comprising:
obtaining the set of physical sub-pixel values associated with the set of mask units, wherein the set of physical sub-pixel values is obtained prior to configuring the at least one mask layer.

25. The method of claim 19, wherein the set of mask units is a set of basic mask units, and the set of physical sub-pixel values is associated with a set of sub-pixel rendering (SPR) values.

26. The method of claim 19, wherein the at least one mask layer is applied or refrained from being applied to one or more physical sub-pixel values of the display panel.

27. The method of claim 19, wherein configuring the at least one mask layer including the set of mask units comprises: designing the at least one mask layer including the set of mask units, wherein the at least one mask layer is designed prior to storing the at least one mask layer to the device storage; wherein storing the at least one mask layer to the device storage comprises: transmitting the at least one mask layer to the device storage; and wherein applying the at least one mask layer to the display panel comprises: transmitting the at least one mask layer to the display panel.

28. The method of claim 19, wherein the run-time period corresponds to a device run-time of the device or a panel run-time of the display panel, wherein the device storage is at least one of: a panel storage, a display driver storage, a user interface (UI) storage, an application storage, or a hardware storage, wherein the at least one mask layer is configured by a display processing unit (DPU) or a display driver integrated circuit (DDIC).

29. An apparatus for display processing, comprising:
means for configuring at least one mask layer including a set of mask units, the set of mask units being associated with a set of physical sub-pixel values, the at least one mask layer being configured based on a target display configuration;
means for storing, upon configuring the at least one mask layer, the at least one mask layer to a device storage of a device;
means for retrieving the at least one mask layer from the device storage during a run-time period after the at least one mask layer is stored;
means for comparing the target display configuration to a current display configuration of a display panel; and
means for applying or refraining from applying the at least one mask layer to the display panel during the run-time period based on the comparison of the target display configuration to the current display configuration.

30. A non-transitory computer-readable medium storing computer executable code for display processing, the code when executed by a processor causes the processor to:
configure at least one mask layer including a set of mask units, the set of mask units being associated with a set of physical sub-pixel values, the at least one mask layer being configured based on a target display configuration;
store, upon configuring the at least one mask layer, the at least one mask layer to a device storage of a device;
retrieve the at least one mask layer from the device storage during a run-time period after the at least one mask layer is stored;
compare the target display configuration to a current display configuration of a display panel; and
apply or refrain from applying the at least one mask layer to the display panel during the run-time period based on the comparison of the target display configuration to the current display configuration.

* * * * *